(12) United States Patent
Emerson et al.

(10) Patent No.: US 7,007,108 B2
(45) Date of Patent: Feb. 28, 2006

(54) SYSTEM METHOD FOR USE OF HARDWARE SEMAPHORES FOR RESOURCE RELEASE NOTIFICATION WHEREIN MESSAGES COMPRISES READ-MODIFY-WRITE OPERATION AND ADDRESS

(75) Inventors: Steven M. Emerson, Chanhassen, MN (US); Gregory F. Hammitt, Eagan, MN (US); Steven G. Kopacek, Maple Grove, MN (US)

(73) Assignee: LSI Logic Corporation, Milpitas, CA (US)

( * ) Notice: Subject to any disclaimer, the term of this patent is extended or adjusted under 35 U.S.C. 154(b) by 322 days.

(21) Appl. No.: 10/426,418

(22) Filed: Apr. 30, 2003

(65) Prior Publication Data

US 2004/0221246 A1 Nov. 4, 2004

(51) Int. Cl.
*G06F 13/00* (2006.01)
*G06F 9/00* (2006.01)
(52) U.S. Cl. .................... 710/4; 710/3; 710/31; 710/52; 710/56; 710/240; 709/226; 709/229; 718/104

(58) Field of Classification Search .................. 710/3, 710/4, 31, 52, 56, 240; 709/226, 229; 718/104
See application file for complete search history.

(56) References Cited

U.S. PATENT DOCUMENTS

| 6,018,785 A | 1/2000 | Wenniger .................... 710/200 |
| 6,725,457 B1 * | 4/2004 | Priem et al. ................. 718/104 |

OTHER PUBLICATIONS

"AMBA™ Specification", (Rev. 2.0), ARM Limited 1999, pp. 1-1 through 6-38 (230 pages).

* cited by examiner

*Primary Examiner*—Tammara Peyton
(74) *Attorney, Agent, or Firm*—Christopher P. Maiorana, P.C.

(57) ABSTRACT

A method for resource notification is disclosed. The method generally comprises the steps of (A) buffering a plurality of messages received from a plurality of busses, (B) arbitrating among the messages, (C) writing the messages in response to the arbitration, and (D) generating a plurality of notification signals on a plurality of lines in response to the messages as written to a plurality of addresses.

20 Claims, 5 Drawing Sheets

SYSTEM METHOD FOR USE OF HARDWARE SEMAPHORES FOR RESOURCE RELEASE NOTIFICATION WHEREIN MESSAGES COMPRISES READ-MODIFY-WRITE OPERATION AND ADDRESS

CROSS REFERENCE TO RELATED APPLICATIONS

The present application relates to co-pending applications (i) Ser. No. 10/262,180 filed Oct. 1, 2002, (ii) Ser. No. 10/323,521 filed Dec. 18, 2002, (iii) Ser. No. 10/325,383 filed Dec. 20, 2002 and (iv) Ser. No. 10/303,589 filed on Nov. 25, 2002 which are hereby incorporated by reference in their entirety.

FIELD OF THE INVENTION

The present invention relates to semaphores generally and, more particularly, to a method and/or architecture for use of hardware semaphores for resource release notification.

BACKGROUND OF THE INVENTION

A conventional method for shared resource release notification includes polling of software semaphores. In such a context, each software semaphore is a globally available memory location used as part of a semaphore set or a semaphore clear operation by all participating masters. By checking a state of a semaphore before attempting to use an associated resource, a master is able to guarantee exclusive access to the resource.

Some existing processors check a semaphore using a SWAP instruction that exchanges a value of an internal register with a value in an external memory location pointed to by one of the registers as an atomic operation. The value in the internal register is first set to indicate the semaphore is in use and then the SWAP instruction is executed. Next, the memory contents, which now reside in the register, are checked to see if the semaphore was already set (i.e., in use) or if the semaphore was cleared (i.e., not used). If the semaphore was cleared, the program obtains ownership of the resource since the SWAP instruction exchanged the cleared value with the set value. If the semaphore is already set, then the value in the memory location is left unchanged and the program tries to obtain ownership at a later time. However, the time just spent querying the state of the semaphore is wasted.

Software semaphores are typically implemented in a shared memory. The semaphores are accessed using a mechanism such as the one described above or in a manner that guarantees exclusive or atomic operation to read-modify-write the semaphore location. A problem with the use of software semaphores is that the associated resources are not used very efficiently. The use of a software semaphore means that a processor first runs a piece of code that reads a semaphore flag to determine whether the resource is available or not. Since the resource is being shared, a possibility exists that at the time the semaphore is checked, the semaphore is in a state that indicates the resource is in use. The master that wants to acquire the resource then idles or performs some other function before returning to recheck the state of the semaphore. Since checking the semaphore state may happen many times before the semaphore is actually set, a lot of time is potentially wasted.

In the time between checks, another possibility exists that the resource could have become available momentarily then reserved by another master. Random checking is also not a very equitable way to share the resource since a likely-hood of gaining access to the resource is directly related to how often a check is performed. At the same time, since masters are not likely to check the state of the resource as soon as it becomes available, the resource itself may become idle in-between uses and so not efficiently used.

Conventional semaphores do not convey any information other than an availability of a resource. Therefore, other software mechanisms are often used to pass messages between different tasks or processors. The software would be designed to allocate and maintain the messages in a portion of a general purpose memory located some where in the system. Each different type of message would allocate additional memory. The software would also be responsible for setting a status bit and triggering an associated interrupt via some other mechanism.

SUMMARY OF THE INVENTION

The present invention concerns a method for resource notification. The method generally comprises the steps of (A) buffering a plurality of messages received from a plurality of busses, (B) arbitrating among the messages, (C) writing the messages in response to the arbitration, and (D) generating a plurality of notification signals on a plurality of lines in response to the messages as written to a plurality of addresses.

The objects, features and advantages of the present invention include providing a method and/or architecture using hardware semaphores for resource release notification that may provide (i) fast notification of when a resource-release or resource-in-use event occurs to all interested masters, (ii) multiport memory and/or multi-layer bus implementations that correctly implement bus locks using no special hardware to achieve correct operation of semaphores, (iii) easy connection to any Advanced High-Speed Bus (AHB) lite compliant subsystems, (iv) a fast and equitable way to allow multiple masters to share a slave and/or resource when combined with a fair sharing method, (v) easy configuration through the use of a single configuration register, (vi) reduction in system latency by having the hardware generate status signals and store messages in a single operation and/or (vii) easy expansion.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
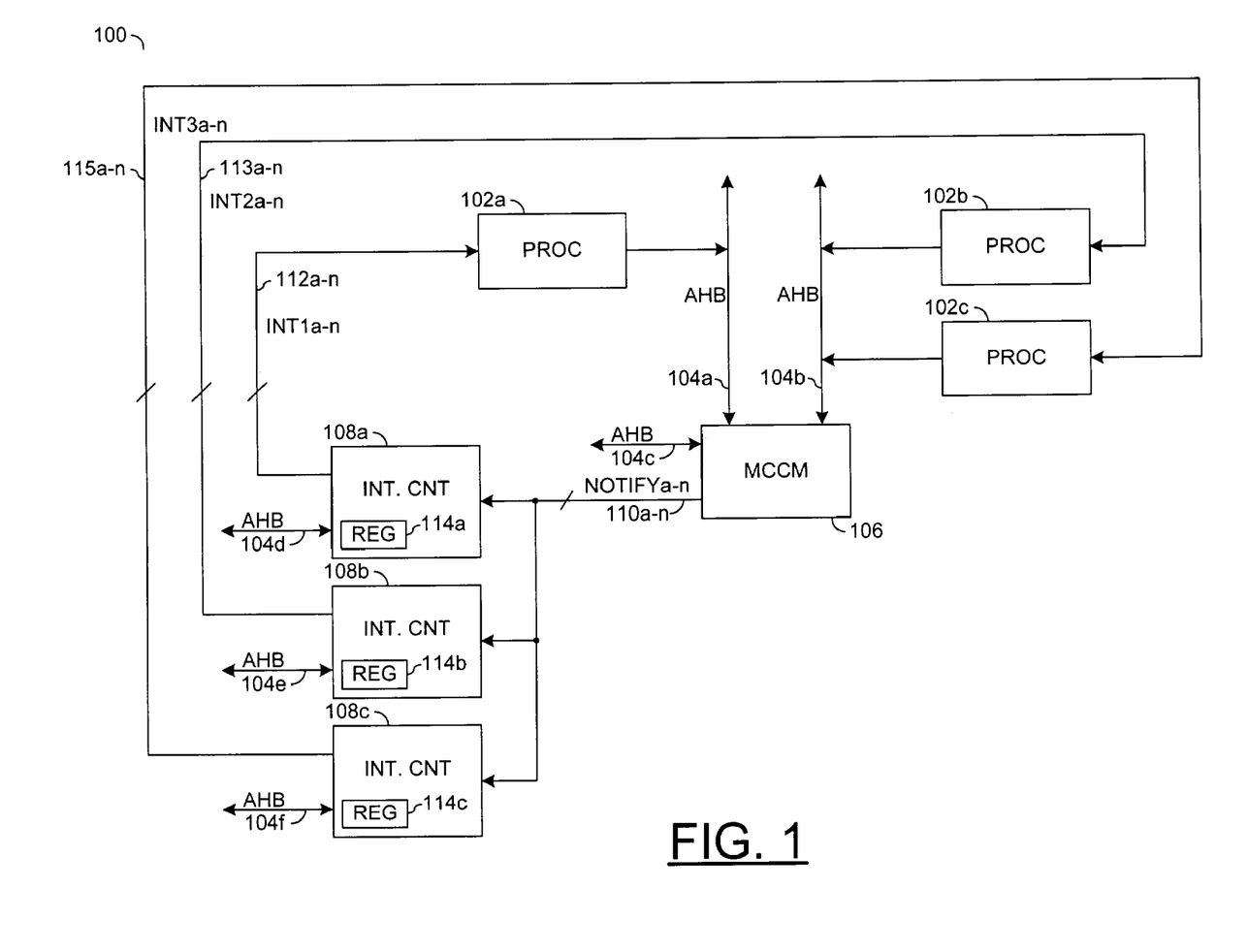
FIG. 1 is a block diagram of an example system in accordance with a preferred embodiment of the present invention.

Referring to FIG. 1, a block diagram of an example system 100 is shown in accordance with a preferred embodiment of the present invention. The system 100 generally includes multiple processor circuits or blocks 102a–c, multiple busses 104a–f, a circuit or block 106 and multiple circuits or blocks 108a–c. The busses 104a–b may be connected the block 106 to one or more of the processor blocks 102a–c. The bus 104c may be used to program or configure the block 106. The busses 104d–f may be used to program or configure the blocks 108a–c. In one embodiment, the busses 104d–f may be the same as the busses 104a–b such that each block 108a–c is on the same bus 104 as the associated processor blocks 102a–c. Multiple lines 110a–n connect the block 106 to the blocks 108a–c. Multiple lines 112a–n, 113a–n and 115a–n may connect the blocks 108a–c to the processor blocks 102a–c, respectively.

The block 106 generally includes hardware semaphores that may be operational to perform resource release notification and/or resource allocation notification. Each semaphore within the block 106 may correspond with a single system resource or a set of system resources. The block 106 may be referred to as a multi-core communications module (MCCM). Each processor block 102a–c may perform a read-modify-write operation across an associated bus 104a–b to the MCCM block 106 to request control of a particular semaphore. One or more messages (e.g., DATA) implementing the read-modify-write operation sent to the MCCM block 106 may command that a conventional "wait" operation be performed on a particular semaphore. The particular resource may be identified by an address (e.g., ADDR) accompanying the message.

If a value read for the particular resource is within an available or not-used range (e.g., greater than zero), the MCCM block 106 may modify the value by decrementing the value. The decremented value may then be written at the address for the particular semaphore. If the read value has an unavailable or in-use value (e.g., zero), the operation may be stored in a queue to wait for the resource to become available.

The processors block 102a–c may generate another read-modify-write message to release control of a semaphore. The message generally instructs the MCCM block 106 to perform a conventional "signal" operation on the addressed semaphore. The MCCM block 106 may read the current value of the semaphore. If the current value is less than a maximum value, the value may be modified by incrementing. The incremented value may then be written at the address of the released semaphore. If the current value equals the maximum value, the semaphore value may remain unmodified.

The MCCM block 106 may generate multiple signals (e.g., NOTIFYa–n) each based on the value and/or state (e.g., available or unavailable) for a respective semaphore. In one embodiment, each signal NOTIFYa–n may be implemented as a single bit signal indicating the state of a semaphore. In another embodiment, each signal NOTIFYa–n may be implemented as a multi-bit signal to convey the multi-bit value of a semaphore. The signals NOTIFYa–n may be transferred to the blocks 108a–c by the lines 110a–n.

The blocks 108a–c may be implemented as an interrupt controller. Each of the interrupt controller blocks 108a–c may be programmed to assert interrupt signals on set of the lines 112a–n, 113a–n and 115a–n upon detecting a transition in a corresponding signal NOTIFYa–n between available and not available states or values. Configuration registers 114a–c within the interrupt controller blocks 108a–c may store programming values. Contents of the configuration registers 114a–c may be reprogrammed by software masters executing on the processor blocks 102a–c.

The configuration registers 114a–c may be programmed to instruct the interrupt controller blocks 108a–c to assert an interrupt (e.g., INT1a–n, INT2a–n and INT3a–n) when the corresponding signal NOTIFYa–n transitions from unavailable to available. The configuration registers 114a–c may also be programmed to instruct the interrupt controller blocks 108a–c to assert the interrupt when the corresponding signal NOTIFYa–n transitions from available to unavailable. The programming may be performed on an interrupt-by-interrupt basis. For example, a first interrupt signal INT1a may be programmed to interrupt the first processor block 102a when a particular resource has become available. However, another interrupt signal INT2a may be programmed to interrupt the second processor 102b when the same particular resource is allocated. In another example, both interrupt signals INT1a and INT2a may be programmed the same such that both the processor blocks 102a and 102b are notified substantially simultaneously when the particular resource becomes available. Multiple interrupts may be programmed through a signal bit of the configuration registers 114a–c.

The interrupt signals INT1a–n, INT2a–n and INT3a–n may quickly inform the masters executing on the processors 102a–c when each resource becomes unused. Therefore, the masters need not spend any time polling the semaphores in search of available resources. Furthermore, the interrupt signals INT1a–n, INT2a–n and INT3a–n may inform the masters when each resource becomes used. As such, the masters need not spend any time competing for access to a resource already in use.

The system 100 may provide an efficient method for implementing a hardware-based resource allocation and release notification scheme. "Resource allocation" is generally a method by which a hardware or software resource may be shared (allocated) among multiple hardware/software masters in a system. "Resource release notification" is generally a method by which multiple masters in a system that share the same resource may determine when the shared resource is no longer in use and therefore available to another master. A scheme for resource allocation and release notification may be useful in systems that share a resource among several masters and use the resource exclusively of other masters. When a master uses a resource, that master may be guaranteed that no other master will try to access the resource until that master releases the resource. The procedure by which a master first gains exclusive access to a peripheral resource may be called "resource reservation" and is generally accomplished using semaphores.

An example implementation of resource allocation notification may be a system with a single universal serial bus (USB) host port that may be accessed periodically by several masters. Since only one master at a time may use the USB, the processors should agree on a method by which ownership of the USB peripheral may be determined, and a period of which exclusive access may occur. In addition, the method may be globally available so that at any instance of time a master wanting to use the USB may easily and quickly determine whether the USB may be in use, and if not, gain exclusive access.

Another example implementation of resource allocation notification may be a use of a particular data structure or area of memory in a software domain. The same steps and issues, as in the example above, generally apply. The resource allocation notification approach may provide each master having access to the particular data structure or area of the memory with a status of the resource and/or a notification of when the resource becomes available.

To be efficient, all masters that make use of a resource should be notified at an exact instance in time, or at least proximate, when the resource is released so each master may attempt to reserve and start using the resource. As a result, little to no time may be lost by the masters polling the semaphore and waiting for release of the resource. In addition, the resource itself may be used more efficiently. As soon as the resource is freed, all potential users may be quickly notified and therefore a new user may quickly resume use of the resource.

A number of masters may compete for access to a resource at any given time. If all of the masters are notified substantially simultaneously that the resource has become available, all of the masters may all check the semaphore to try to gain ownership, but only one will win. The losing masters may have to return to some idle state or other tasks until the resource is available once again. Therefore, the present invention may minimize a large amount of unsuccessful attempts at reserving the resource using software semaphores. The software semaphores generally help to guarantee fair and equitable use of the shared resource. For example a software semaphore known as Peterson's algorithm may implemented to allocate a shared resource among the masters. Other allocation methods may be implemented to meet the design criteria of a particular application.

Peterson's algorithm was developed in 1981 and proved versions for both a 2-process case and an N-process case. Both a turn variable and a status flag variable may be used in the process. After setting a flag, a master may immediately give away the turn. The masters then waits for the turn if and only if the other flag is set. By waiting on the "and" of two conditions, a need to clear and reset the flags may be avoided. Peterson's algorithm is generally shown as follows:

Initialization:

```
typedef char boolean;
shared boolean flags[n-1];
shared int turn;
turn = i ;
flags[i] = FREE;
flags[j] = FREE;
```

Entry Protocol (for Process i):

```
/* claim the resource */
flags[i] = BUSY;
/* give away the turn */
turn = j
/* wait while the other process is using the resource and
has the turn */
    while ((flags[j] = = BUSY) && (turn != i)) {
02-5552
1496.00286
    }
EXIT PROTOCOL (for Process i):
    /* release the resource */
    flags[i] = FREE;
```

Mutual exclusion is generally assured in the above process. For example, suppose that both masters are in a critical section. Since only one master may have the turn, the other master may have reached the "while" test before the master with the turn set its flag. But after setting its flag, the other master may have to give away the turn. The master at the "while" test may have already changed the turn and will not change it again, contradicting the initial assumption.

Since the turn variable may only be considered when both masters are using, or trying to use, the resource a deadlock is generally not possible. If both masters are testing the "while" condition, one master should have the turn and thus proceed. Finally, bounded waiting delays may be assured. When a master that has exited attempts to reenter, that master may give away the turn. If the other master is already waiting, the other master will generally be the next to proceed.

The system 100 generally implements a scheme whereby the state of the semaphores may be made available to the interrupt controller blocks 108a–c. Since the interrupt controller blocks 108a–c generally allow the processors 102a–c to immediately take action when an event occurs, the setting or clearing event of a semaphore may be immediately considered allowing a processor block 102a–c to gain ownership of the resource. The event may be triggered upon setting the semaphore active. No extra cycles are generally spent checking whether the semaphore may be available and so the processor blocks 102a–c may use the extra time executing more useful tasks.

The present invention may be implemented using software semaphores or hardware semaphores. In either case, the state of the semaphore may be constantly available as a signal to the interrupt controller block 106 or other similar type of control block. Hardware semaphores give an added advantage that the masters generally do not depend on a SWAP type instruction to examine the value/state of the semaphores. Additionally, masters that may be interconnected using multiple buses, where it may be difficult to lock out other masters, generally benefit from the use of hardware semaphores.

Figure 2:
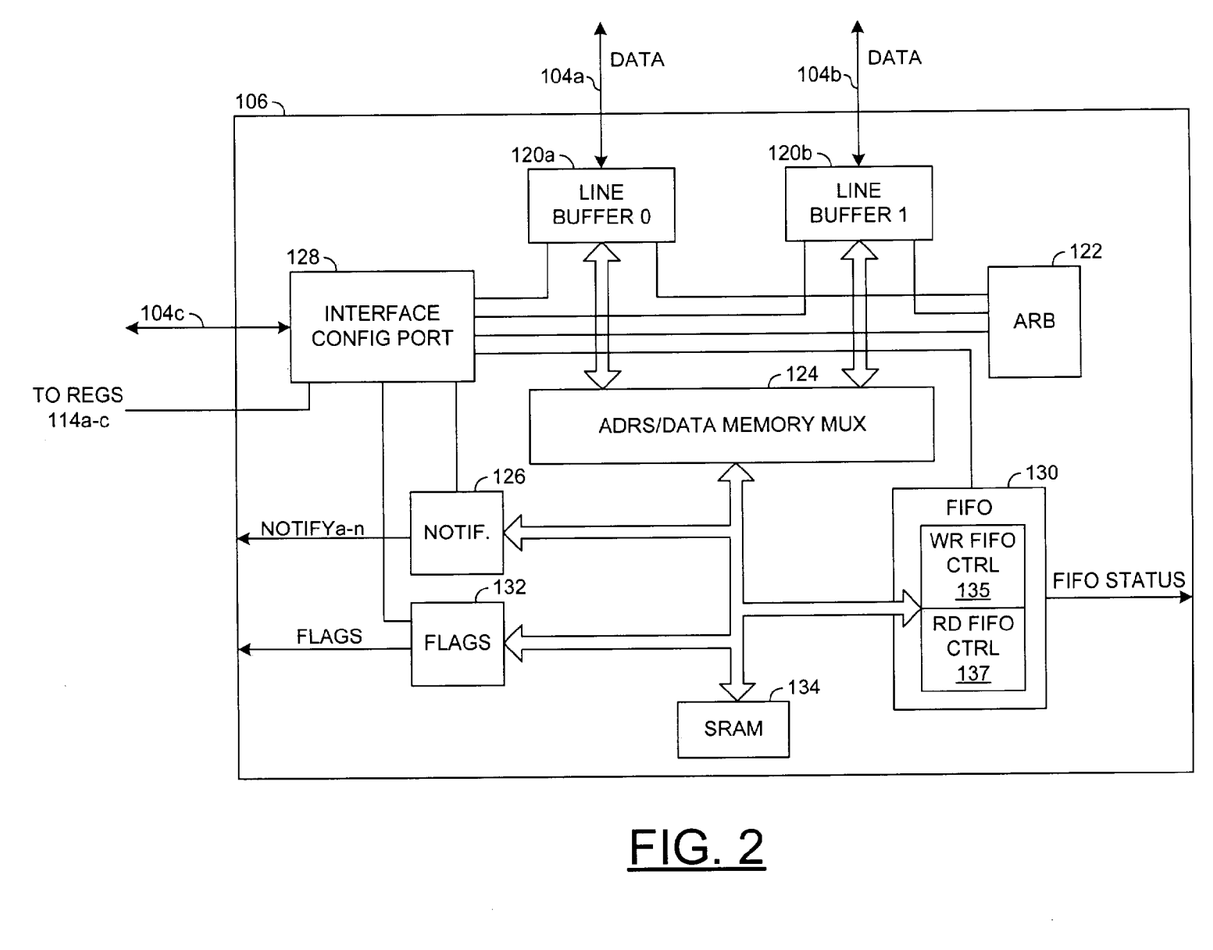
FIG. 2 is a block diagram of an example implementation of a multi-core communications module block.

Referring to FIG. 2, a block diagram of an example implementation of an MCCM block 106 is shown. The MCCM block 106 is generally a multi-ported peripheral that allows access to a common memory area, FIFOs, flags, and semaphores by multiple masters on different busses 102a–b. The MCCM block 106 generally comprises one or more line buffer circuits or blocks 120a–b, an arbiter circuit or block 122, a multiplexer 124, a notification circuit or block 126, an interface configuration port circuit or block 128, one or more optional FIFO circuits or blocks 130, one or more optional flag circuits or blocks 132 and an optional memory circuit or block 134. Additional details for the MCCM block 106 may be found in the related application Ser. No. 10/303,589 titled, "Multi-Core Communications Module, Data Communications System Incorporating a Multi-Core Communications Module, and Data Communications Process".

Each line buffer block 120a–b may be connected to one of the busses 104a–b, respectively. Further details for the line buffer blocks 120a–b may be found in the related application Ser. No. 10/323,521 titled, "AMBA Slave Modular Bus Interfaces". Each bus 104a–b may be implemented as an Advanced High-Performance Bus (AHB) defined in an "Advanced Microcontroller Bus Architecture (AMBA) Specification", revision 2.0, 1999, published by ARM Limited, Cambridge, England and hereby incorporated by reference in its entirety. Other bus standards may be implemented to meet a design criteria of a particular application.

The arbiter block 122 may be operational to control access to the notification block 126 through the line buffer blocks 120*a–b*. Further details for the arbiter block may be found in the related application Ser. No. 10/262,180 titled, "Arbitration Within a Multiport AMBA Slave". The arbiter block 122 may provide exclusive access to semaphores within the notification block 126 by restricting access to the notification block 126 through the multiplexer block 124 to one of the line buffer blocks 120*a–b* at any given time.

The notification block 126 may be connected to the multiplexer block 124 to exchange information with the line buffer circuits 120*a–b*. The lines 110*a–n* may connect the notification block 126 to the interrupt controller blocks 108*a–c*. The notification block 126 may be designed to perform conventional multi-value semaphore operations, binary semaphore operations, single bit message (SBM) operations and/or single word message (SWM) operations. Each semaphore, SBM and SWM of the notification block 126 may be related to one or more resource within the MCCM block 106 and/or elsewhere in the system 100. Each semaphore, SBM and SWM may also be related to a corresponding line 110*a–n* to report a value and/or state to the interrupt controller blocks 108*a–c*.

The interface configuration block 128 may be operational to program and configure the other blocks within the MCCM block 106. The interface configuration block 128 may also be operational to read and write programming data to the configuration registers 114*a–c* of the interrupt controller blocks 108*a–c*. Further details of the interface configuration block 128 may be found in the related application Ser. No. 10/323,521 titled, "AMBA Slave Modular Bus Interfaces".

The FIFO block 130 may be coupled to the multiplexer block 124 to exchange data with the line buffer blocks 120*a–d*. The FIFO block 130 generally includes a write FIFO control block 135 and a read FIFO control block 137. The flag block 132 may also be coupled to the multiplexer block 124 to exchange data with the line buffer blocks 120*a–d*. Status signals (e.g., FIFO STATUS) from the FIFO block 130 and flag signals (e.g., FLAGS) from the flag block 132 may be routed to the interrupt controller blocks 108*a–c* to indicate system conditions between the processors blocks 102*a–c*. Additional information for the FIFO block 130, the flag block 132 the write FIFO control block 135 and the read FIFO control block 137 may be found in the related application Ser. No. 10/303,589 titled, "Multi-Core Communications Module, Data Communications System Incorporating a Multi-Core Communications Module, and Data Communications Process".

The memory block 134 may be coupled to the multiplexer block 134 and directly to each line buffer block 120*a–b* to exchange data with the line buffer blocks 120*a–b*. The memory block 134 may be implemented as an SRAM, SDRAM, DRAM or any other suitable memory type. Further details for the memory block 134 may be found in the related application Ser. No. 10/325,383 titled, "AMBA Modular Memory Controller".

Figure 3:
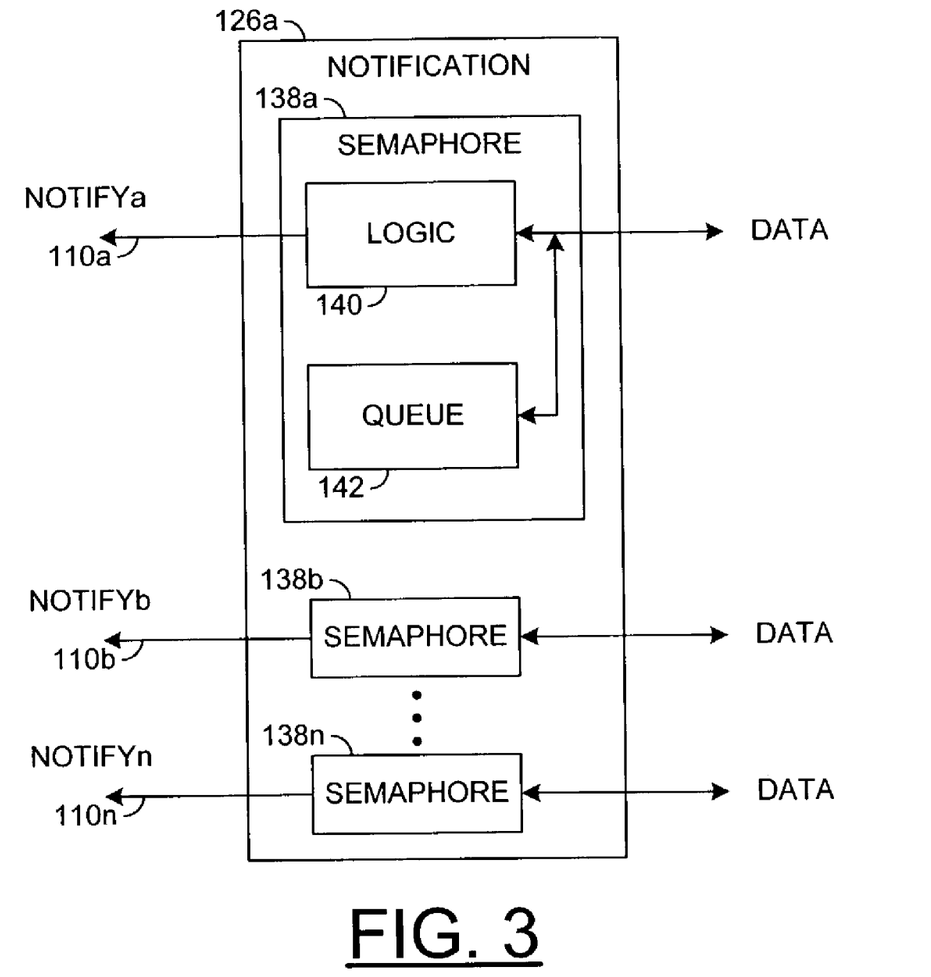
FIG. 3 is a block diagram of an example implementation of semaphores in a notification block.

Referring to FIG. 3, a block diagram of an example implementation of semaphores in a notification block 126*a* is shown. Each semaphore circuit or block 138*a–n* generally comprises a logic circuit or block 140 and a queue circuit or block 142. The logic block 140 may be adapted to perform a multi-value or a binary semaphore operation. The value or state held in the logic block 140 may be presented in a signal NOTIFY*a–n* on a line 110*a–n* to the interrupt controller blocks 108*a–c*. The queue block 142 may be adapted to queue requests received for control of the associated resource while the associated resource is in use and thus unavailable.

In one embodiment, the interrupt controller blocks 108*a–c* may be configured to be sensitive to either an assertion or a deassertion of a single-bit signal NOTIFY*a–n*. In another embodiment, the interrupt controller blocks 108*a–c* may be configured to be sensitive to a transition between an unavailable value (e.g., zero) and an available value (e.g., greater than zero) of a multi-bit signal NOTIFY*a–n*. Therefore, each of the interrupt controller blocks 108*a–c* may be individually programmed to signal an instance in time that a resource may be either reserved or released. A choice of which event asserts the interrupt may be determined by the masters as the interrupt controller blocks 108*a–c* may be modified under program control to be sensitive to either a rising or falling edge. Therefore, the processor blocks 102*a–c* may dynamically program which edge may be of interest.

The MCCM block 106 may implement the hardware semaphore blocks 138*a–n* as banks of 32 semaphores. Additional banks may be added or removed using a Verilog compile-time parameter when the MCCM block 106 is compiled. Selection of binary semaphores or multi-value semaphores may also be determined at compile-time.

Figure 4:
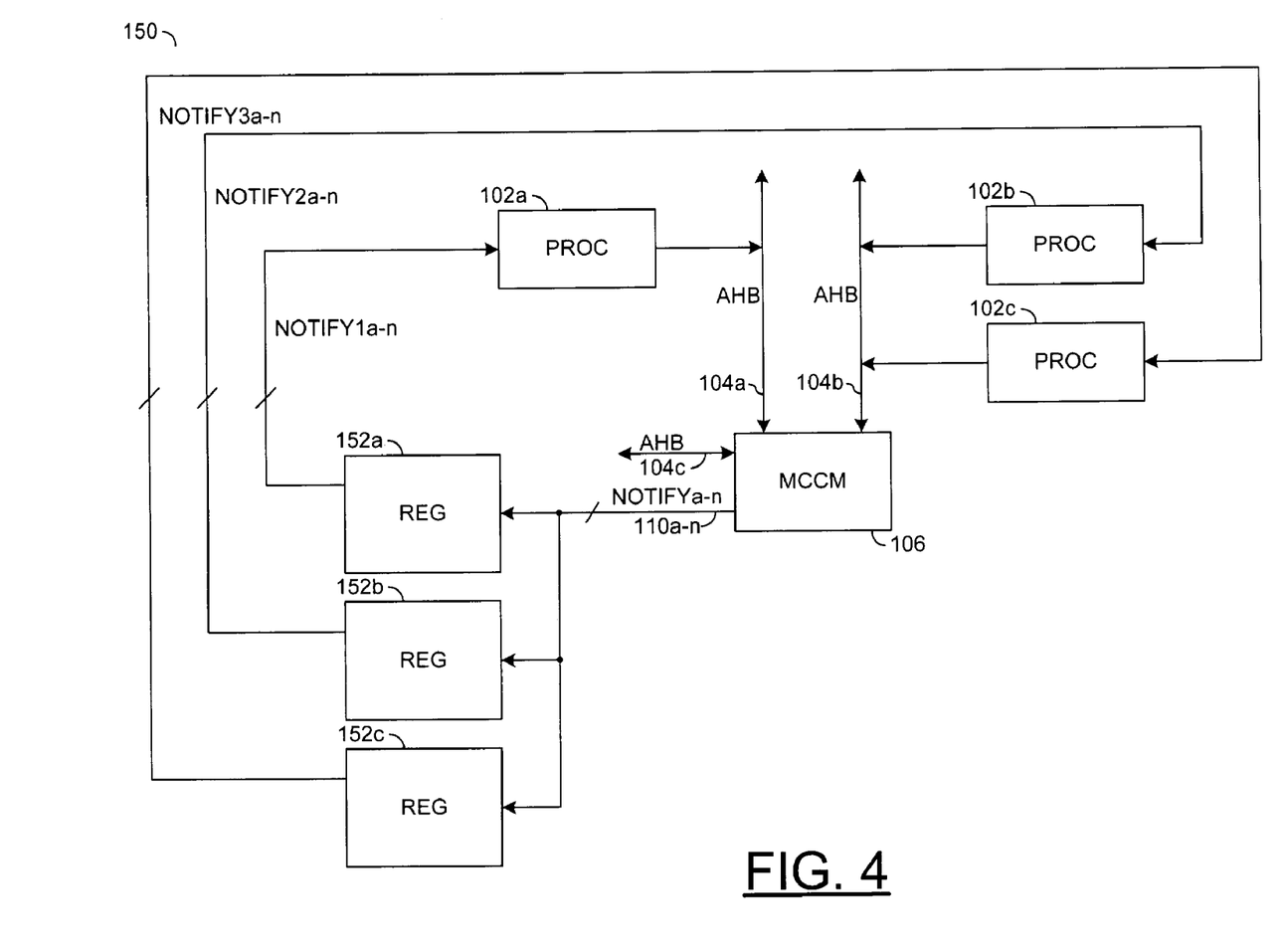
FIG. 4 is a block diagram of another example implementation of a system.

Referring to FIG. 4, a block diagram of another example implementation of a system 150 is shown. The system 150 may be similar to the system 100 shown in FIG. 1 with polling registers 152*a–c* used instead of the interrupt controller blocks 108*a–c*. The signals NOTIFY*a–n* generated by the MCCM block 106 may be stored in the polling registers 152*a–c*. The polling registers 152*a–c* may be accessible to each of the processor blocks 102*a–c*, respectively, to permit the processor blocks 102*a–c* to read the values/states of the semaphores via output signals (e.g., NOTIFY1*a–n*, NOTIFY2*a–n* and NOTIFY3*a–n*), respectively.

The notification block 126 may be configured to implement a single bit message (SBM) and/or a single word message (SWM) communication mechanism between multiple AMBA subsystems. The communication mechanism may be independent of a specific AMBA compliant processor type. The notification block 126 may provide two different methods of hardware communication between the processors 102*a–c*. Messages sent to the MCCM block 106 may have an option of a single bit response or an ability to embed a more meaningful response in the message depending upon how the messaging mechanism is initialized. If a SWM mechanism is initialized to overlap the memory block 134, the message generally has the ability to contain meaningful data word, termed a WORD response. If the mechanism is initialized to not overlap the memory block 134, the message may contain all zeros with a single bit set in a predetermined (e.g., least significant bit) position of every data byte returned to the requesting AHB master, termed a BIT response. In both configurations, a status bit is generally set and may be available in a signal NOTIFY*a–n* to be routed to the interrupt controller blocks 108*a–c*.

The SBM/SWM mechanisms are generally intended to perform in a system as a semaphore as described above. A system implementing the SWM mechanism generally contains at least one line buffer block 120*a–b* and enough physical address space in the memory block 134 to implement a planned number of messaging components.

Figure 5:
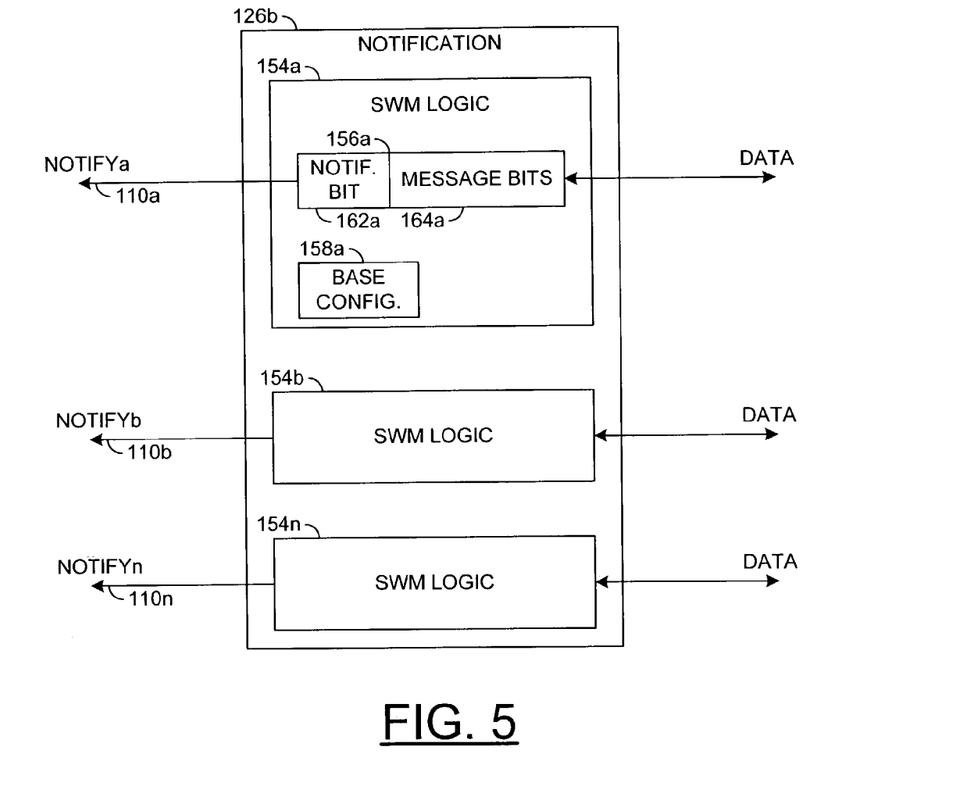
FIG. 5 is a block diagram of an example implementation of a single word messaging capability in a notification block.

Referring to FIG. 5, a block diagram of an example implementation of a single word messaging capability in a notification block 126*b* is shown. The notification block 126b generally comprises a plurality of SWM logic circuits or blocks 154a–n. The SWM logic block 154a–n generally comprises a status register 156a–n and a base configuration register 158a–n, respectively. The status registers 156a–n may have a predetermined bit position 162a–n and optional multiple message bits 164a–n, respectively. The bit positions 162a–n may be referred to as status bits or notification bits. The SWM logic blocks 154a–n may present the values stored in the notification bits 162a–n in the signals NOTIFYa–n. When connected to the interrupt controller blocks 108a–c, the values stored in the notification bits 162a–n generally give the system an ability to detect when a resource becomes available and/or unavailable. The base address registers 158a–n give the SWM logic blocks 154a–n an ability to either be positioned in a physical address range or space of the memory block 134 or to be positioned outside the physical memory space.

Figure 6:
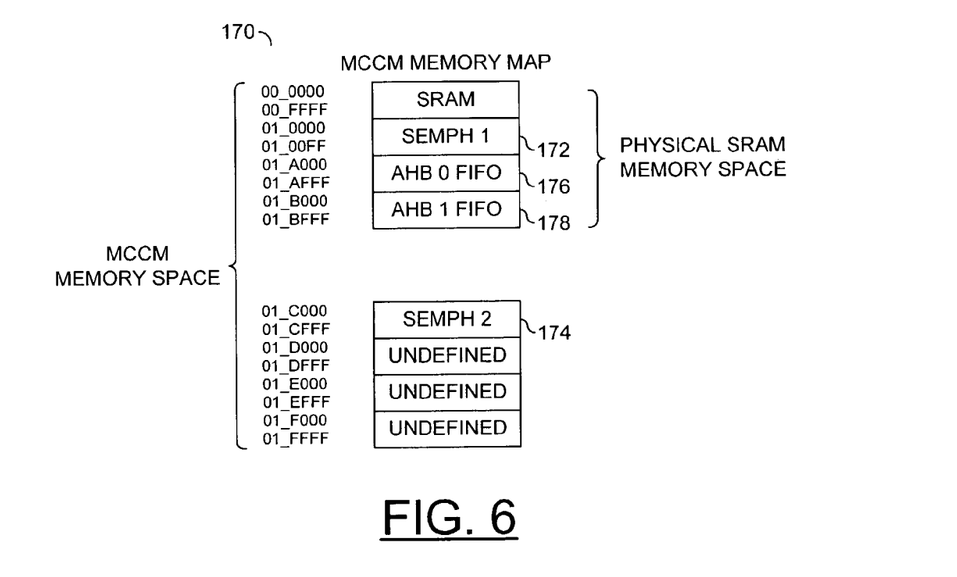
FIG. 6 is a memory map of an example placement of single word message semaphores.

Referring to FIG. 6, a memory map 170 of an example placement of single word message semaphores is shown. The memory map 170 illustrates an address space of an MCCM block 106 ranging from 00_0000 (hexadecimal) to 01_FFFF. The memory block 134 may have a physical address ranging from 00_0000 to 01_BFFF.

A SWM 172 (e.g., Semph 1) may be configured to reside in the physical memory space at address 01_0000 to 01_00FF and a SWM 174 (e.g., Semph 2) may be configured to reside outside of physical memory space range at address 01_C000 to 01_CFFF while still within in the memory space of the MCCM block 106. A first FIFO 176 (e.g., AHB 0 FIFO) may be allocated to an address range of 01_A000 to 01_AFFF. A second FIFO 178 (e.g., AHB 1 FIFO) may be allocated to an address range of 01_B000 to 01_BFFF.

In a SWM scenario where a requesting processor block 102a–c attempts to lock a resource, the requesting processor block 102a–c may utilize a read-modify-write locking sequence of interface commands. If the resource is locked by another processor block 102a–c, the read data may have a nonzero value and therefore not modified. If the resource is not locked by another processor block 102a–c, the read data may have a zero value and therefore a new data value will be written. If the requesting processor block 102a–c does not utilize a locking sequence of interface commands, it may be theoretically possible for a second processor block 102a–c to sneak in between commands and lock the resource.

In a physical memory overlap scenario, when a specific SWM is set via a write to a specific address location of the memory block 134, a corresponding SWM notification bit 162a–n within the notification block 126 may be set. Thus, a processor block 102a–c setting a SWM may be able to perform two operations in one command, (i) set the system SWM notification bit and (ii) store an associated single word message into the physical memory space. When a different processor block 102a–c reads a specific SWM, the read data may be copied from the memory block 134 to the appropriate line buffer block 120a–b then returned to the requesting processor block 102a–c. Storing the single word message in the memory block 134 enables the MCCM block 106 to pass a meaningful message to the requesting processor block 102a–c. An example single word message could be a unique processor identifier which currently is utilizing a shared resource.

In a non-physical memory overlap scenario, when a specific SWM is set via a write to a specific memory address location of the MCCM block 106, only the corresponding SWM notification bit 162a–n may be set within the notification block 126. When a second processor block 102a–c reads the specific address for the SWM location, the read data returned to the requesting processor block 102a–c may have the same bit in each word byte set per the notification bit 162a–n. Repeating the notification bit 162a–n in each byte of the read data may be allow for a return of nonzero/zero read data for requesters of any AHB HSIZE. With only the notification bit 162a–n of the message stored, the non-physical overlap scenario may operate as a single bit message.

In one embodiment, the SWM logic blocks 154a–n may include the message bits 164a–n. The notification block 126b may thus be adapted to store the full single word messages independently of the memory block 134. Therefore, single word messaging may be implemented where the addresses stored in the base configuration registers 158a–n is outside the physical address range of the memory block 134. In another example, the MCCM block 106 may be implemented without the memory block 134 as the notification block 126b performs all storage operations.

The SWM communications generally gives a system designer an ability to easily tailor the SWM function for specific needs by a simple configuration register operation. The feature implements the SWMs in blocks of 32 and may easily be expanded to 128. Other numbers of SWMs may be implemented to meet a design criteria of a particular application. Once configured, through a simple read-modify-write or lock operation, the requesting processor block 102a–c may lock a system resource and change the value of the notification bit 162a–n, all in a single operation. The system may thus be relieved of an overhead and latency associated with a software implementation.

The present invention may provide many combinations of the line buffer blocks 120a–b, semaphore sizes, flag sizes and/or FIFO sizes. The number of combinations is generally compounded when the size and endian-ness of the AHB busses 104a–b is considered. A feature of the present invention may be the coupling of the two modes of message passing into a single module. Another feature of the invention may be coupling hardware semaphores with exposed state information such that the state information may be connected to an interrupt controller or other programmer visible register.

The present invention generally gives the system programmer the ability to select which mode of message to use and the quantity of each specific type of message mechanism. The invention generally frees the system designer from making the decision of which message mechanism to select early in the design process. The system designer may have the freedom to change the number and type of specific message mechanisms at any time until the module is synthesized. After synthesis, the system designer may still has an ability to utilize any number of message mechanisms up to the maximum hardware configuration.

The present invention may be useful in designs having communication between AHB subsystems using multiple forms of single word message passing. The invention may also be useful in increasing performance of a multiport memory system by replacing traditionally software forms of interprocessor communication with a hardware implementation. The invention is generally useful in a multi-core or multi-processor system to implement fast and efficient sharing of resources such that both polling cycles in a master and idle cycles for the shared slave may be minimized.

Furthermore, software executing on the processor blocks 102a–c may be relieved of maintaining inter-processor types of message. The MCCM block 106 may be configured to provide either a bit type response or a word response. The software may still allocates system memory space for the messaging, but no longer consumes memory space which could be better utilized for some other function. The message may be stored and interrupts generated in a single operation saving system overhead and reducing latency associated with setting the notification signals separately.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for resource notification comprising the steps of:
   (A) buffering a plurality of messages received from a plurality of busses, each of said messages comprising a read-modify-write operation and an address;
   (B) arbitrating among said messages for access to a plurality of semaphores associated with a plurality of resources;
   (C) modifying said semaphores identified by said addresses with said read-modify-write operations in response to said arbitration; and
   (D) generating a plurality of notification signals on a plurality of lines in response to said modifications of said semaphores.

2. The method according to claim 1, further comprising the step of:
   generating a plurality of interrupt signals to a plurality of processors communicating on said busses in response to said notification signals.

3. The method according to claim 2, further comprising the step of:
   asserting one of said interrupt signals in response to a corresponding one of said notification signals transitioning from available to unavailable.

4. The method according to claim 3, further comprising the step of:
   reprogramming said one of said interrupt signals to assert in response to said corresponding one of said notification signals transitioning from said unavailable to said available.

5. The method according to claim 1, further comprising the step of:
   storing said notification signals for polling by a plurality of processors.

6. The method according to claim 1, wherein step (D) comprises the sub-step of:
   generating each of said notification signals in response to a notification bit in each of said messages.

7. The method according to claim 6, further comprising the step of:
   storing said messages at said addresses, where said addresses overlap a range of a physical memory.

8. The method according to claim 7, further comprising the step of:
   copying a particular message of said messages stored within said range to a particular bus of said busses in response to a read command.

9. The method according to claim 6, further comprising the step of:
   storing only said notification bits from said messages written to said addresses outside a range of a physical memory.

10. The method according to claim 9, further comprising the step of:
    copying a particular bit of said notification bits stored outside said range to a particular bus of said busses in response to a read command.

11. A circuit comprising:
    a plurality of buffer blocks configured to (i) receive a plurality of messages from a plurality of busses, each of said messages comprising a read-modify-write operation and an address and (ii) modifying a plurality of semaphores identified by said addresses with said read-modify-write operations;
    an arbiter block configured to arbitrate among said messages for access to a said semaphores associated with a plurality of resources; and
    a notification block configured to generate a plurality of notification signals on a plurality of lines in response to said modifications of said semaphores.

12. The circuit according to claim 11, further comprising:
    an interrupt controller configured to generate a plurality of interrupts to a plurality of processors communicating on said busses in response to said notification signals.

13. The circuit according to claim 11, further comprising:
    a register configured to store said notification signals for polling.

14. The circuit according to claim 11, further comprising:
    a memory block occupying a range of said addresses and configured to store said messages written within said range.

15. The circuit according to claim 14, wherein said notification block is further configured to:
    store a notification bit from each of said messages written to said addresses outside said range.

16. The circuit according to claim 11, wherein said notification block is further configured to:
    store said messages written to said addresses.

17. The circuit according to claim 16, wherein said notification block is further configured to perform a plurality of different semaphore type operations.

18. The circuit according to claim 11, further comprising:
    a first memory block configured to store data from said buffer blocks in a first-in-first-out order.

19. The circuit according to claim 18, further comprising:
    a second memory block configured to store flags from said buffer blocks.

20. A circuit comprising:
    means for buffering a plurality of messages received from a plurality of processor communication via a plurality of busses, each of said messages comprising a read-modify-write operation and an address;
    means for arbitrating among said messages for access to a plurality of semaphores associated with a plurality of resources;
    means for modifying said semaphores identified by said addresses with said read-modify-write operations in response to said arbitration; and
    means for generating a plurality of notification signals on a plurality of lines in response to said modifications of said semaphores.

* * * * *